US012322408B2

(12) United States Patent
Hikima et al.

(10) Patent No.: US 12,322,408 B2
(45) Date of Patent: Jun. 3, 2025

(54) CALL PROCESSING APPARATUS

(71) Applicant: DENSO TEN Limited, Kobe (JP)

(72) Inventors: Katsuaki Hikima, Kobe (JP); Soju Sakamoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 266 days.

(21) Appl. No.: 18/147,953

(22) Filed: Dec. 29, 2022

(65) Prior Publication Data

US 2023/0290368 A1 Sep. 14, 2023

(30) Foreign Application Priority Data

Mar. 9, 2022 (JP) ................................ 2022-036639

(51) Int. Cl.
*G10L 21/0232* (2013.01)
*G10L 21/0208* (2013.01)

(52) U.S. Cl.
CPC ...... *G10L 21/0232* (2013.01); *G10L 21/0208* (2013.01); *G10L 2021/02085* (2013.01); *G10L 2021/02087* (2013.01)

(58) Field of Classification Search
CPC ....... G10L 21/0208; G10L 2021/02085; G10L 2021/02087; G10L 21/0232; G10L 21/02
See application file for complete search history.

(56) References Cited

U.S. PATENT DOCUMENTS

| | | | | |
|---|---|---|---|---|
| 6,295,364 B1 * | 9/2001 | Finn | G10L 21/0208 381/71.4 |
| 10,121,488 B1 * | 11/2018 | Drews | G10L 21/013 |
| 2002/0071573 A1 * | 6/2002 | Finn | H04M 9/08 381/95 |
| 2004/0176083 A1 * | 9/2004 | Shiao | H04M 3/436 455/414.1 |
| 2009/0119099 A1 * | 5/2009 | Lee | G10L 21/0208 704/226 |
| 2011/0300806 A1 * | 12/2011 | Lindahl | G10L 21/0208 455/63.1 |
| 2013/0090932 A1 * | 4/2013 | Miyazaki | H04M 1/6091 704/E21.001 |
| 2016/0127827 A1 * | 5/2016 | Tzirkel-Hancock | H04R 3/002 381/71.4 |
| 2016/0219431 A1 * | 7/2016 | Belur | H04M 1/6091 |
| 2016/0329060 A1 * | 11/2016 | Ito | H04M 1/72445 |
| 2023/0290368 A1 * | 9/2023 | Hikima | G10L 21/0208 |

FOREIGN PATENT DOCUMENTS

JP 2000-332677 A 11/2000

* cited by examiner

*Primary Examiner* — Samuel G Neway
(74) *Attorney, Agent, or Firm* — Oliff PLC

(57) ABSTRACT

A call processing apparatus according to an embodiment includes a controller. The controller is configured to (i) perform a removal process of removing driving sounds of a vehicle other than a specific driving sound from sounds collected by a microphone in a cabin of the vehicle while an occupant of the vehicle is talking on a phone, and (ii) transmit an adjusted sound generated by performing the removal process to a call opposite party who is talking with the occupant of the vehicle via the phone.

9 Claims, 5 Drawing Sheets

| DRIVING SOUND | FEATURE INFORMATION |
|---|---|
| AIR CONDITIONER SOUND | FEATURE INFORMATION #1 |
| WIND NOISE WHEN WINDOW IS OPENED | FEATURE INFORMATION #2 |
| TRAVELING SOUND | FEATURE INFORMATION #3 |
| ENGINE SOUND | FEATURE INFORMATION #4 |
| TIRE NOISE WHEN STEERING WHEEL IS TURNED | FEATURE INFORMATION #5 |
| BLINKER SOUND | FEATURE INFORMATION #6 |
| WIPER SOUND | FEATURE INFORMATION #7 |
| BUTTON SWITCH SOUND | FEATURE INFORMATION #8 |

FIG. 3

CALL PROCESSING APPARATUS

BACKGROUND OF THE INVENTION

Field of the Invention

The invention relates to a call processing apparatus and a call processing method.

Description of the Background Art

Conventionally, for example, a technology that a vehicle occupant talks on a hands-free phone has been known. In this type of technology, a pseudo environmental sound is generated and transmitted so as to allow a call opposite party to understand that the vehicle occupant cannot talk because the vehicle occupant is driving (for example, refer to Japanese Published Unexamined Patent Application No. 2000-332677).

However, in the conventional technology, since the environmental sound is just spuriously generated, the call opposite party may not always understand that the occupant cannot talk while the occupant is driving.

SUMMARY OF THE INVENTION

According to one aspect of the invention, a call processing apparatus includes a controller. The controller is configured to (i) perform a removal process of removing driving sounds of a vehicle other than a specific driving sound from sounds collected by a microphone in a cabin of the vehicle while an occupant of the vehicle is talking on a phone, and (ii) transmit an adjusted sound generated by performing the removal process to a call opposite party who is talking with the occupant of the vehicle via the phone.

It is an object of the invention to provide a call processing apparatus and a call processing method capable of allowing a call opposite party who is talking with an occupant of a vehicle via a phone to accurately understand that the occupant of the vehicle is driving.

These and other objects, features, aspects and advantages of the invention will become more apparent from the following detailed description of the invention when taken in conjunction with the accompanying drawings.

BRIEF DESCRIPTION OF THE DRAWINGS

FIG. 3 illustrates one example of sound feature information;

DESCRIPTION OF THE EMBODIMENTS

A call processing apparatus and a call processing method according to an embodiment will be described in detail below with reference to the accompanying drawings. In addition, this invention is not limited to the embodiment described below.

Figure 1:
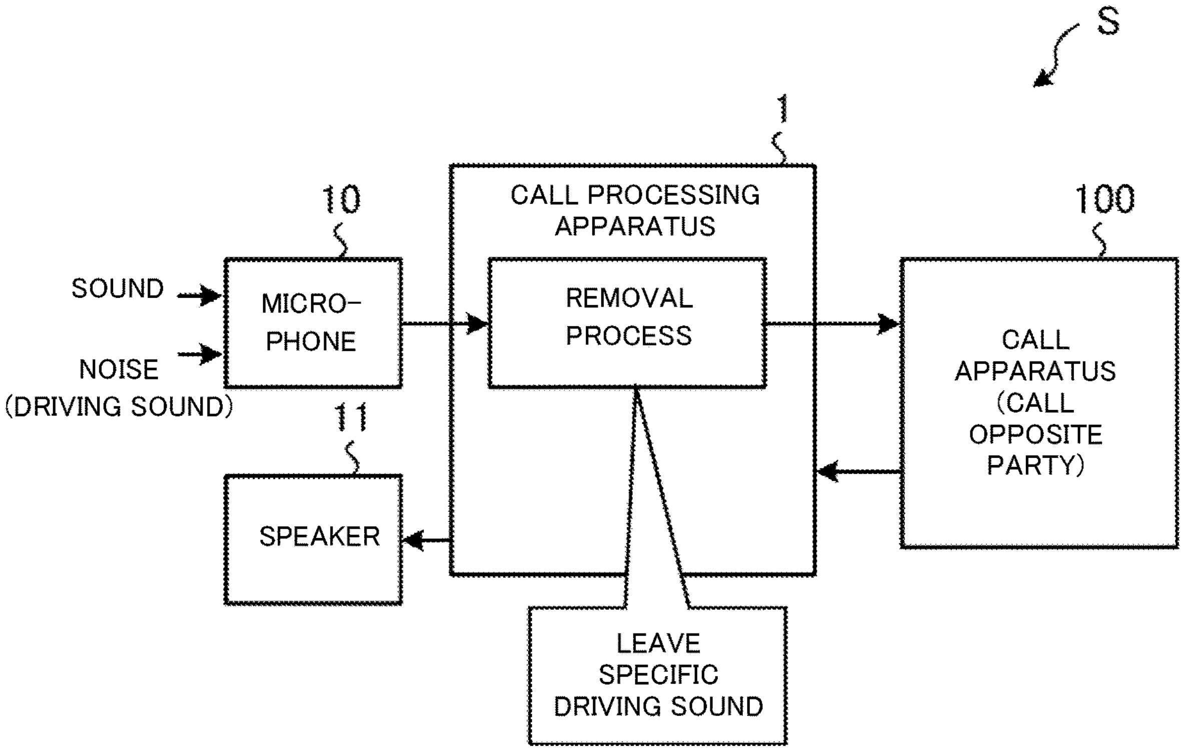
FIG. 1 illustrates an outline of a call processing method according to an embodiment.

First, an outline of the call processing method according to the embodiment will be described with reference to FIG. 1. FIG. 1 illustrates the outline of the call processing method according to the embodiment. FIG. 1 illustrates a configuration example of a call system S according to the embodiment.

The call system S illustrated in FIG. 1 is, for example, mounted on a vehicle and operates when an occupant of the vehicle talks with a call opposite party on a hands-free phone. As illustrated in FIG. 1, the call system S includes a call processing apparatus 1, a microphone 10, a speaker 11, and a call apparatus 100. In a configuration of the call system S, the call processing apparatus 1, the microphone 10, and the speaker 11 are mounted on the vehicle in which the occupant who talks on the phone rides, and the call apparatus 100 is mounted on a terminal apparatus possessed by the call opposite party. The call processing method according to the embodiment is executed by the call processing apparatus 1.

The microphone 10 is mounted in a vehicle cabin and collects sounds in the vehicle cabin. Specifically, the microphone 10 collects a noise, such as an environmental sound of the vehicle, and sounds including a speech of the occupant. Examples of the environmental sound of the vehicle include a driving sound generated when the vehicle is driven. Examples of the driving sound, for example, include a vehicle traveling sound, an engine sound, an air conditioner sound, a blinker sound, a wiper sound, and various switch sounds. The speaker 11 is an output apparatus that outputs voices of the call opposite party.

The call processing apparatus 1 performs a removal process of removing the noise from the sounds collected by the microphone 10 to generate an adjusted sound and transmit the adjusted sound to the call apparatus 100.

Here, when a driver as the occupant wants to concentrate on driving, a call with the call opposite party becomes troublesome. Thus, the driver may terminate the call as soon as possible. However, in the conventional removal process, since various types of noise is removed to allow the speech of the occupant to be clearly transmitted to the call opposite party, it is difficult for the call opposite party to understand that the occupant is driving.

In this point, in the conventional technology, since a pseudo environmental sound is generated and transmitted with sounds, it is possible to allow the call opposite party to understand that the occupant is driving. However, in the conventional technology, since the environmental sound is just spuriously generated, the call opposite party may not always understand that the occupant cannot talk because the occupant is driving.

Therefore, in the call processing method according to the embodiment, among the driving sounds generated when the vehicle is driven, the removal process of leaving a specific driving sound and removing other driving sounds is performed.

Although details will be described later, in the call processing method according to the embodiment, for example, the driving sound that hardly interrupts the call, such as a blinker sound, and allows the call opposite party to understand that the occupant is driving is selectively left and transmitted to the call opposite party.

That is, since a part of the actual driving sounds is transmitted to the call opposite party, it is possible to allow the call opposite party to accurately understand that the occupant is driving compared to the environmental sound that is just spuriously generated. Furthermore, since the driving sound that hardly interrupts the call is left and transmitted, it is possible to prevent a call quality from deteriorating.

Figure 2:
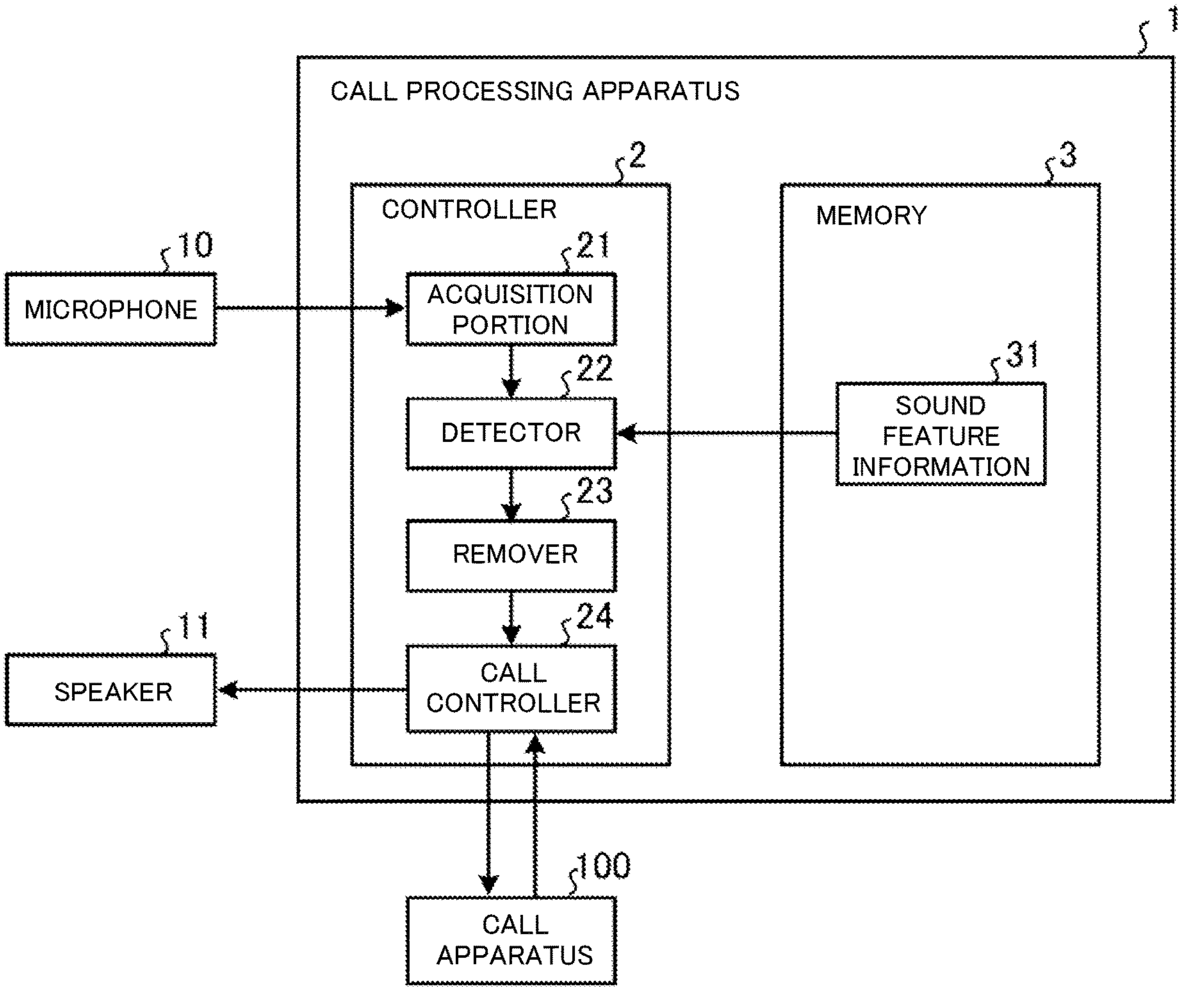
FIG. 2 is a block diagram illustrating a functional configuration of a call processing apparatus according to the embodiment.

Next, a configuration example of the call processing apparatus 1 according to the embodiment will be described with reference to FIG. 2. FIG. 2 is a block diagram illustrating a functional configuration example of the call processing apparatus 1 according to the embodiment.

As illustrated in FIG. 2, the call processing apparatus 1 according to the embodiment includes a controller 2 and a memory 3. The controller 2 includes an acquisition portion 21, a detector 22, a remover 23, and a call controller 24. The memory 3 stores sound feature information 31.

Here, the call processing apparatus 1 includes a computer having, for example, a CPU (Central Processing Unit), a ROM (Read Only Memory), a RAM (Random Access Memory), a flash memory, an input/output port, and the like, and various circuits.

The CPU of the computer reads out and executes a program stored in the ROM, for example, so as to function as the acquisition portion 21, the detector 22, the remover 23 and the call controller 24 of the controller 2.

At least one or all of the acquisition portion 21, the detector 22, the remover 23 and the call controller 24 of the controller 2 may be constituted of hardware such as an ASIC (Application Specific Integrated Circuit) and an FPGA (Field Programmable Gate Array).

The memory 3 corresponds to the RAM and/or the flash memory. The RAM and the flash memory are able to store the sound feature information 31, and various program information, and the like. The call processing apparatus 1 may acquire the above-mentioned program and various information via another computer connected to the call processing apparatus 1 by using a wired/wireless network, or a portable recording medium.

The sound feature information 31 includes information relating to a feature of the driving sound. For example, the sound feature information 31 is generated by experiments, and the like, in advance. The sound feature information 31 may be results obtained by collecting the driving sounds when the vehicle actually travels using the microphone 10 and analyzing the collected driving sounds.

FIG. 3 illustrates one example of the sound feature information 31. As illustrated in FIG. 3, the sound feature information 31 includes items such as the "driving sound" and "feature information".

The "driving sound" is a name of the driving sound or a name indicating a generation source and is information for identifying the driving sound. The "feature information" is information showing the feature of the driving sound. In FIG. 3, although the "feature information" is expressed by "feature information #1" and the like, information such as frequency characteristics, amplitude characteristics, sound pressure level characteristics, an intermittent cycle, and the like, are actually input. The intermittent cycle is a feature of the driving sound that is generated at predetermined second intervals, for example, such as a blinker sound, a wiper sound, and the like.

Next, each function of the controller 2 (the acquisition portion 21, the detector 22, the remover 23, and the call controller 24) will be described in detail.

The acquisition portion 21 acquires sounds collected by the microphone 10. For example, the acquisition portion 21 acquires the sounds collected by the microphone 10 during a period in which it is in a call state (connection state) to the call opposite party.

One microphone 10 is arranged in a position (e.g., near a room mirror) capable of collecting the voices of all occupants present in the vehicle. Alternatively, a plurality of microphones 10 may be arranged in positions corresponding to respective seat positions and separately collect the voices of the occupants in the respective seats.

The detector 22 detects the driving sound generated when the vehicle is driven from the sounds acquired by the acquisition portion 21. Specifically, the detector 22 detects the driving sound included in the sound feature information 31 with referent to the sound feature information 31 stored in the memory 3.

That is, the detector 22 stores the feature of the sound for each generation source of the driving sound as the sound feature information 31 in advance, and detects the driving sound having a specific feature as the specific driving sound.

Furthermore, the detector 22 detects the specific driving sound among the detected driving sounds. The specific driving sound is, as described above, the driving sound that is left without being removed in the removal process. That is, the detector 22 performs a process of distinguishing the specific driving sound that is left in the removal process from the other driving sounds that are removed in the removal process.

As described above, since the feature of the sound for each generation source of the driving sound is stored as the sound feature information 31 in advance, and the driving sound having the specific feature is detected as the specific driving sound, it is possible to accurately distinguish the specific driving sound that is left in the removal process from the other driving sounds that are removed in the removal process.

For example, the detector 22 detects the driving sound that hardly interrupts the call as the specific driving sound. Examples of the driving sound that hardly interrupts the call include a tire noise when a steering wheel is turned, a blinker sound, a wiper sound, a button switch sound, and the like, in the sound feature information 31. The tire noise when the steering wheel is turned means, for example, a tire noise (a scream of tires) generated by friction with a road surface coated with a paint, such as an indoor parking space.

Figure 4:
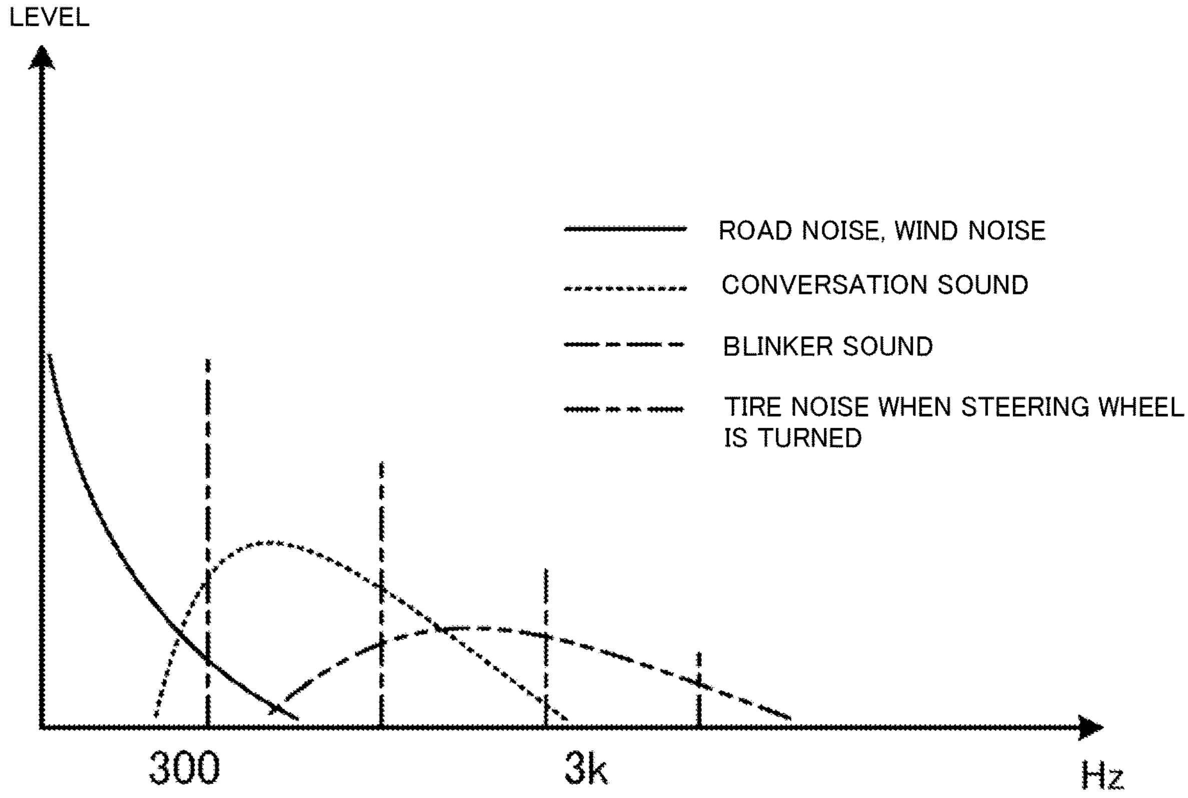
FIG. 4 illustrates frequency characteristics of a driving sound.

Specifically, the detector 22 detects a specific frequency band as the specific driving sound. This point will be described with reference to FIG. 4. FIG. 4 illustrates frequency characteristics of the driving sound.

FIG. 4 illustrates frequency characteristics of a road noise (traveling sound) and a wind noise when a window is opened, frequency characteristics of a conversation sound (speech sound), frequency characteristics of a blinker sound (or wiper sound), and frequency characteristics of the tire noise when the steering wheel is turned.

In an example illustrated in FIG. 4, the specific driving sound is the blinker sound and the tire noise when the steering wheel is turned. That is, the remover 23 of a latter stage removes the road noise and the wind noise, and leaves the blinker sound and the tire noise when the steering wheel is turned The detector 22 detects the specific frequency band as the specific driving sound based on the frequency characteristics of the driving sound illustrated in FIG. 4. For example, the detector 22 detects the frequency band including the blinker sound and the tire noise when the steering wheel is turned as the specific frequency band.

In the example illustrated in FIG. 4, the detector 22 detects, for example, a frequency band of 1 kHz or more as the specific frequency band. That is, the detector 22 detects the driving sound having a frequency higher than a predetermined frequency (1 kHz) as the specific driving sound.

Thus, it is possible to leave the "driving sound that hardly interrupts the call" in the removal process without identifying each driving sound.

Furthermore, the detector 22 detects the driving sound in the frequency band other than a frequency band corresponding to the conversation sound as the specific driving sound based on the frequency characteristics of the driving sound illustrated in FIG. 4. In the example illustrated in FIG. 4, the detector 22 detects, for example, the driving sound in the frequency band other than a frequency band of 300 Hz to 3 kHz as the specific driving sound.

Thus, since the driving sound having same frequency characteristics as those of the conversation sound is removed, it is possible to accurately prevent the conversation sound from being buried in the driving sound.

The remover 23 performs the removal process of leaving the specific driving sound among the driving sounds detected by the detector 22 and removing the other driving sounds. In other words, the removal process is a process of removing or reducing the driving sounds of the vehicle other than the specific driving sound. For example, the removal process is performed by mixing a signal having the frequency characteristics corresponding to the driving sound with the sound in an opposite phase.

For example, the remover 23 leaves the specific frequency band corresponding to the specific driving sound and removing other frequency bands corresponding to the other driving sounds.

Specifically, the remover 23 performs the removal process of leaving the specific driving sound having a frequency higher than the predetermined frequency (1 kHz). Furthermore, the remover 23 performs the removal process of leaving the specific driving sound corresponding to the frequency band other than the frequency band corresponding to the conversation sound.

The remover 23 may perform the removal process according to a vehicle traveling speed (vehicle speed). For example, for a traveling sound and an engine sound in the sound feature information 31, the remover 23 reduces a degree of removal as the vehicle speed becomes higher. In other words, when the vehicle speed is equal to or higher than a predetermined value, the traveling sound and the engine sound are treated as the specific driving sound.

For example, when the traveling sound and the engine sound are left in the removal process, as the vehicle speed becomes higher, a sound pressure level of such a driving sound may be increased. Thus, in such a situation that the vehicle speed is high and the driver needs to concentrate on driving, it is possible to allow the call opposite party to understand that the occupant is driving by allowing the call opposite party to hear the traveling sound and engine sound.

The remover 23 may determine whether or not the occupant who is talking on the phone is a driver of the vehicle and change the sound pressure level of the specific driving sound that is not removed in the removal process according to a determination result.

For example, when the occupant who is talking on the phone is not the driver, the remover 23 decreases the sound pressure level of the driving sound that is not removed by the removal process compared to when the occupant who is talking on the phone (i.e., a caller) is the driver.

Thus, when the caller is not the driver, it is possible to prevent the call opposite party from misunderstanding that the caller is driving. The determination whether or not the caller is the driver of the vehicle is performed, for example, based on a relationship between the sound pressure levels of the sounds collected by the microphone 10 and a positional relation between the microphone 10 and the occupant.

For example, when the caller is the driver, as call duration becomes longer, the remover 23 increases the sound pressure level of the driving sound that is not removed by the removal process. Thus, when the driver talks on the phone, the call duration is accurately prevented from becoming longer.

The call controller 24 transmits the adjusted sound that has been removal processed by the remover 23 to the call apparatus 100. Furthermore, the call controller 24 outputs a speech of the call opposite party that has been acquired from the call apparatus 100 from the speaker 11.

Figure 5:
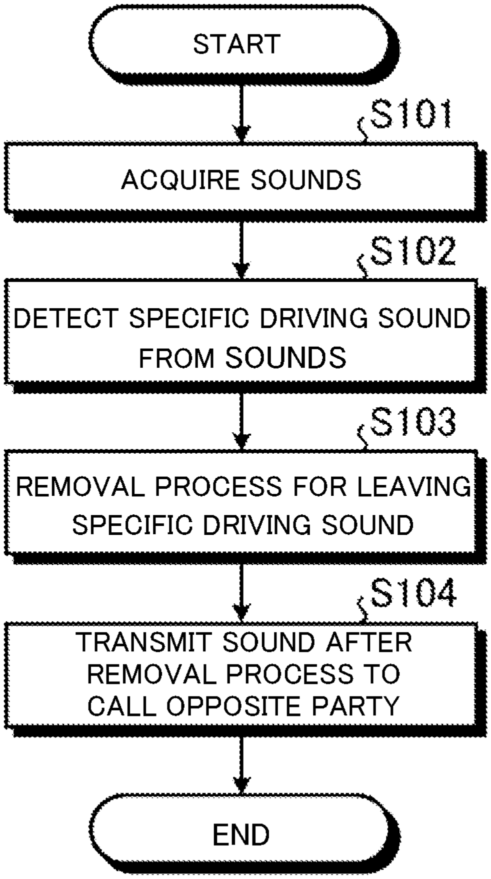
FIG. 5 is a flowchart illustrating a processing procedure of a whole process executed by the call processing apparatus according to the embodiment.

Next, a processing procedure of a process executed by the call processing apparatus 1 according to the embodiment will be described with reference to FIG. 5. FIG. 5 is a flowchart illustrating the processing procedure of a whole process executed by the call processing apparatus 1 according to the embodiment.

As illustrated in FIG. 5, the acquisition portion 21 acquires the sounds collected by the microphone 10 (a step S101).

Subsequently, the detector 22 detects the specific driving sound from the sounds with reference to the sound feature information 31 (a step S102).

Subsequently, the remover 23 performs the removal process of leaving the specific driving sound detected by the detector 22 and removing the other driving sounds (a step S103).

Subsequently, the call controller 24 transmits the adjusted sound that is a sound after the removal process to the call apparatus 100 (a step S104) and ends the process.

As described above, the call processing apparatus 1 according to the embodiment includes the controller 2. While the occupant is talking on the phone, for the sounds collected by the microphone 10 in the vehicle cabin, the controller 2 performs the removal process of leaving the specific driving sound among the driving sounds generated when the vehicle is driven and removing the other driving sounds. Then, the controller 2 transmits the adjusted sound generated by performing the removal process to the call opposite party (call apparatus 100). As a result, it is possible to allow the call opposite party to accurately understand that the occupant of the vehicle is driving.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. A call processing apparatus comprising:

a controller configured to (i) perform a removal process of removing driving sounds of a vehicle while not removing a specific driving sound from sounds collected by a microphone in a cabin of the vehicle while an occupant of the vehicle is talking hands-free on a phone, the driving sounds, including the specific driving sound that is not removed, being audible environmental sounds that are generated by the vehicle and that are not conversation sound of the occupant, and (ii) transmit an adjusted sound generated by performing the removal process to a call opposite party who is talking with the occupant of the vehicle via the phone, wherein the driving sounds that are audible environmental sounds and that are removed by the controller are in a frequency range that is below and partially within a frequency range of the conversation sound of the occupant, and the specific driving sound that is an audible environmental sound and that is not removed by the controller is in a frequency range that is partially within and above the frequency range of the conversation sound of the occupant.

2. The call processing apparatus according to claim 1, wherein the controller stores a feature of a sound for each generation source of the driving sounds in advance, and performs the removal process of removing the driving sounds of the vehicle other than the specific driving sound having a specific one of the features.

3. The call processing apparatus according to claim 1, wherein the controller performs the removal process of removing the driving sounds of the vehicle other than the specific driving sound having a frequency higher than a predetermined frequency.

4. The call processing apparatus according to claim 1, wherein as a vehicle speed of the vehicle becomes higher, the controller increases a sound pressure level of the specific driving sound that is not removed by the removal process.

5. The call processing apparatus according to claim 1, wherein the controller determines whether or not the occupant who is talking on the phone is a driver of the vehicle, and when the occupant is not the driver of the vehicle, the controller decreases a sound pressure level of the specific driving sound that is not removed by the removal process compared to when the occupant who is talking is the driver of the vehicle.

6. The call processing apparatus according to claim 1, wherein as call duration becomes longer, the controller increases a sound pressure level of the specific driving sound that is not removed by the removal process.

7. A call processing method executed by a computer, the method comprising the steps of:

(a) performing, by a controller of the computer, a removal process of removing driving sounds of a vehicle while not removing a specific driving sound from sounds collected by a microphone in a cabin of the vehicle while an occupant of the vehicle is talking hands-free on a phone, the driving sounds, including the specific driving sound that is not removed, being audible environmental sounds that are generated by the vehicle and that are not conversation sound of the occupant; and (b) transmitting, by the controller, an adjusted sound generated by performing the removal process to a call opposite party who is talking with the occupant of the vehicle via the phone, wherein the driving sounds that are audible environmental sounds and that are removed by the controller are in a frequency range that is below and partially within a frequency range of the conversation sound of the occupant, and the specific driving sound that is an audible environmental sound and that is not removed by the controller is in a frequency range that is partially within and above the frequency range of the conversation sound of the occupant.

8. A call processing apparatus comprising:

a controller configured to (i) perform a removal process of removing driving sounds of a vehicle other than a specific driving sound from sounds collected by a microphone in a cabin of the vehicle while an occupant of the vehicle is talking on a phone, and (ii) transmit an adjusted sound generated by performing the removal process to a call opposite party who is talking with the occupant of the vehicle via the phone, wherein the controller determines whether or not the occupant who is talking on the phone is a driver of the vehicle, and when the occupant is not the driver of the vehicle, the controller decreases a sound pressure level of the specific driving sound that is not removed by the removal process compared to when the occupant who is talking is the driver of the vehicle.

9. A call processing apparatus comprising:

a controller configured to (i) perform a removal process of removing driving sounds of a vehicle other than a specific driving sound from sounds collected by a microphone in a cabin of the vehicle while an occupant of the vehicle is talking on a phone, and (ii) transmit an adjusted sound generated by performing the removal process to a call opposite party who is talking with the occupant of the vehicle via the phone, wherein as call duration becomes longer, the controller increases a sound pressure level of the specific driving sound that is not removed by the removal process.

* * * * *